United States Patent
Hui

(10) Patent No.: US 8,709,243 B2
(45) Date of Patent: Apr. 29, 2014

(54) POOL CLEANING VEHICLE HAVING STRUCTURE FOR CLEANING AND SANITIZING POOL WATER

(75) Inventor: Wing-kin Hui, Hong Kong (HK)

(73) Assignee: Smartpool LLC, Lakewood, NJ (US)

( * ) Notice: Subject to any disclaimer, the term of this patent is extended or adjusted under 35 U.S.C. 154(b) by 0 days.

(21) Appl. No.: 12/272,908

(22) Filed: Nov. 18, 2008

(65) Prior Publication Data

US 2011/0139727 A1 Jun. 16, 2011

(51) Int. Cl.
*E04H 4/16* (2006.01)
*B01D 11/00* (2006.01)

(52) U.S. Cl.
USPC .............. 210/167.11; 210/167.17; 210/416.2; 210/749

(58) Field of Classification Search
USPC .............. 210/167.1, 167.11, 167.16, 167.17, 210/416.2, 749, 753, 754, 756
See application file for complete search history.

(56) References Cited

U.S. PATENT DOCUMENTS

| | | | | |
|---|---|---|---|---|
| 2,934,409 | A * | 4/1960 | Biehl | 422/265 |
| 3,107,156 | A * | 10/1963 | Fredericks | 422/264 |
| 4,652,366 | A * | 3/1987 | Brooks | 210/167.11 |
| 5,419,909 | A * | 5/1995 | Edwards et al. | 424/405 |
| 5,795,551 | A * | 8/1998 | Powell | 422/264 |
| 5,882,512 | A * | 3/1999 | Denkewicz et al. | 210/167.11 |
| 5,976,385 | A | 11/1999 | King | 210/754 |
| 6,727,219 | B2 * | 4/2004 | Buckland et al. | 510/439 |
| 7,118,678 | B2 | 10/2006 | Porat | 210/748 |
| 7,316,751 | B2 * | 1/2008 | Horvath et al. | 134/21 |
| 2006/0053572 | A1 | 3/2006 | Porat | 15/1.7 |
| 2008/0185347 | A1 * | 8/2008 | Tufano et al. | 210/749 |
| 2008/0237103 | A1 * | 10/2008 | King | 210/167.11 |

* cited by examiner

Primary Examiner — Fred Prince
(74) Attorney, Agent, or Firm — Birch, Stewart, Kolasch & Birch, LLP

(57) ABSTRACT

An improved pool cleaning vehicle with the ability to clean and sanitize pool water includes a housing having an interior. The vehicle includes a chemical dispenser member connected to the housing. The chemical dispenser member has a hollow interior suitable for storing chemicals for sanitizing pool water. The chemical dispenser member includes an inlet for allowing pool water to contact the chemical dispenser member. The chemical dispenser member includes a dissolvable seal and upon continued contact with water, the seal dissolves. The chemical dispenser member also includes an outlet facilitating communication between the chemical dispenser member and the pool water.

13 Claims, 5 Drawing Sheets

POOL CLEANING VEHICLE HAVING STRUCTURE FOR CLEANING AND SANITIZING POOL WATER

FIELD OF THE INVENTION

This invention generally relates to the field of automated pool products. More particularly, this invention relates to a swimming pool vehicle, which includes the ability for cleaning and sanitizing pool water.

BACKGROUND OF THE INVENTION

It is now well accepted that automated pool cleaning devices, such as self-propelled pool cleaning vehicles are essential to the proper maintenance of a pool, whether the pool be above or below ground. The typical vehicle includes a housing, a bottom frame and a filtering member, such as a filter bag, held between the two. The vehicle includes intake and outlet ports.

As the pool cleaner moves along the surface of the pool, water flows into the intake port and through to the filter bag. The typical pool cleaning vehicle includes a pump which creates suction. The suction helps cause the housing intake door to open and allow water to flow therethrough as the vehicle moves.

Upon entering the filter bag, the pool water is cleaned. Dirt and debris are trapped wherein the filter bag. Water then exits through the outlet port, cleaner and with less dirt and debris prior to re-entering the pool.

While this type of cleaning is required and essential for the maintenance of pool water, it is also insufficient. Water must be fit for human contact before it can be usable as pool water. Thus, it is simply not enough for the water to be clean or in other words, relatively free of dirt and debris, it must be sanitary.

In order to sanitize the water and make it fit for human contact, chemicals such as chlorine, are typically are placed in the pool water. However, adding chemicals to pool water requires some precision. Obviously, adding too much of a particular chemical, such as chlorine, could equally make the pool water dangerous and unsafe for human usage.

Thus, a balance needs to be struck between no chemicals or too little chemicals and too much chemicals. A large number of pool owners employ experts in the field of pool maintenance to add the proper chemicals and in the right amount to the pool. Maintenance of this type is continuous and can easily become quite expensive.

On the other hand, pool owners find adding the proper chemicals in the correct amount time consuming and quite tedious using manual methods. Pool water must be measured and referenced. Then on a regular basis, such as weekly, the pool owner will check his water chemical levels. The pool owner will then need to measure and add the proper amount of chemicals.

Quite clearly, being expert at testing and measuring and adding chemicals to pool water is not an easy task. It is a tedious task and one that requires constant vigilance. Even an occasional mistake can lead the pool water to be unfit for human use and contact. In such cases, a pool sometimes will need to be drained. Quite clearly this is not desirable and should be avoided as much as possible. This is especially so in drought prone areas where water is almost always at a premium.

There are current and past floatation devices in the past which have included cages for holding solid chemicals and openings for allowing chlorine to mix with the pool water. The chlorine mixes with the surface water of the pool and is only partially effective at adding chlorine to the water. The surface water is the most exposed to the sun of all the pool's water and the chlorine is most likely to evaporate and become ineffective as a result of being on the surface the quickest. Additionally, the mixing of the chemicals on the surface does not necessarily penetrate to the lower levels of the pool water.

What is needed is an automated device, which can, over time, add the proper chemicals and the proper amount of chemical to pools. Also, needed is such an automated device, which ensures proper mixing of the chemicals with the pool water.

SUMMARY OF THE INVENTION

The structure, in accordance with the present invention, is a pool cleaning vehicle, having a chemical dispenser for adding chemicals to pool water. The chemical dispenser in one embodiment is integral with the vehicle housing and in other embodiments is external to the vehicle. In all cases, the chemical dispenser works cooperatively with the pool cleaning vehicle. The vehicle typically includes a filter bag, which traps dirt and debris and prevents its return to the pool water.

The combination of cleaning the pool water of particulate materials and the addition of chemicals act to clean and sanitize the pool, generally and make the pool water fit for intimate human usage. Thus, the combination of the vehicle's filter function plus the chemical dispenser's ability to add the proper chemicals in the right amounts results in pool water which is clean and sanitary. And, since the above is done by automated means, the result device offers clean and sanitary water for pool owners and in commercial settings with a minimum of amount of labor.

Thus, it is an object of this invention is to provide a pool cleaning vehicle having a chemical dispenser for adding chemicals to pool water in an automated fashion.

It is an additional object of this invention to provide such a pool cleaning vehicle, which can be integrated with known pool cleaning vehicles.

It is an additional object of this invention to provide such a pool cleaning vehicle, which uses both liquid and solid chemicals to be added to the pool water and which does not require the user to handle the chemicals directly.

In accordance with the objects set forth above and as will be described herein, the pool cleaning vehicle including a housing and the housing having an interior, the pool cleaning vehicle in accordance with this invention, comprises:

a chemical dispenser member connected to the housing, the chemical dispenser having a hollow interior suitable for storing chemicals for sanitizing pool water, the chemical dispenser member having an inlet for allowing pool water to contact the chemical dispenser member;

the chemical dispenser member having a dissolvable seal and upon continued contact with water, the seal dissolving;

the chemical dispenser member having an outlet facilitating communication between the chemical dispenser member and the pool water through the chemical dispenser member outlet;

whereby upon the seal being dissolved, communication between the interior of the chemical dispenser member and the pool water is established.

In another exemplary embodiment, the chemical dispenser member includes chemicals in its interior for sanitizing the pool water. The chemicals are in a self-contained container and are sealed with the water dissolvable seal as recited above. Upon dissolving of the seal, an opening to the container is revealed. The opening, in large part, determines the amount of chemicals, which are released into the pool. Additionally, there may be more than one sealable opening depending upon the amount of chemical that is to be released to the pool water.

It will be appreciated that a series of openings could be provided to provide cross-ventilation of the container. This would clearly increase the amount of chemical released into the pool water.

In another exemplary embodiment, the chemical or chemicals within the container may be liquid or solid.

In another exemplary embodiment, the method of cleaning and sanitizing the pool water is disclosed. The steps of the method in accordance with this invention, comprise:
   causing the pool water to enter the vehicle;
   filtering the pool water through use of a filter bag;
   transferring pool water through chemical dispenser member;
   out flowing pool water to the pool after passing through the filter bag and the chemical dispenser member;

It is an advantage of the pool cleaning vehicle in accordance with this invention to clean and sanitize pool water while minimizing the amount of time required and while using, as much as possible known pool cleaning devices.

It is an additional advantage of the instant invention to provide such a vehicle, which does not require the user to come into direct contact with the chemicals themselves.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
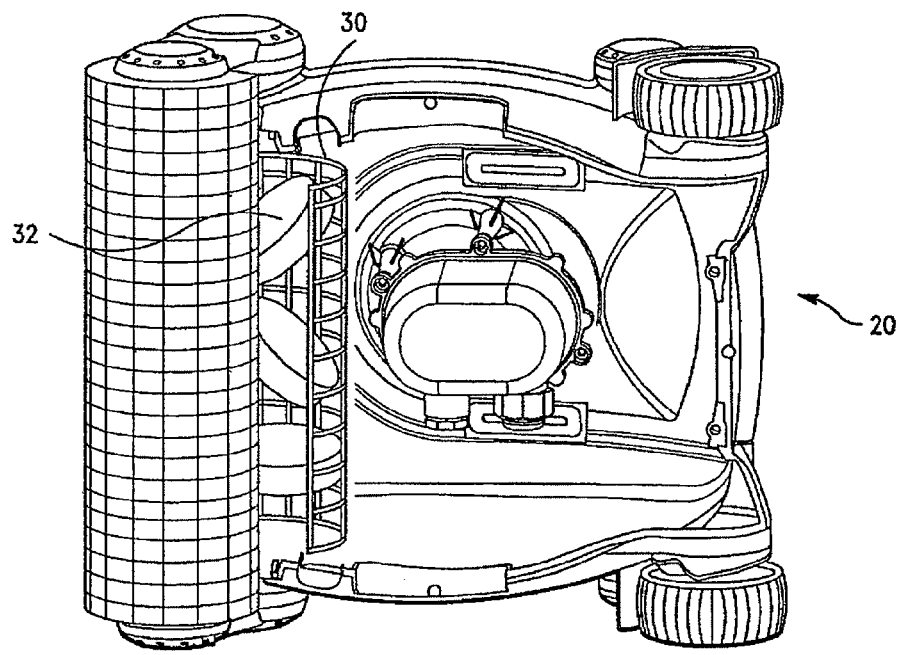
FIG. 1 is a bottom perspective view of the pool cleaning vehicle in accordance with this invention illustrating a chemical dispenser member.

With respect to FIG. 1 there is shown an exemplary embodiment of the pool cleaning vehicle in accordance with this invention generally denoted by the numeral 20. The vehicle 20 includes a chemical dispenser member 30. The vehicle 20 includes chemical packets 32 held by the chemical dispenser member 30.

Figure 2:
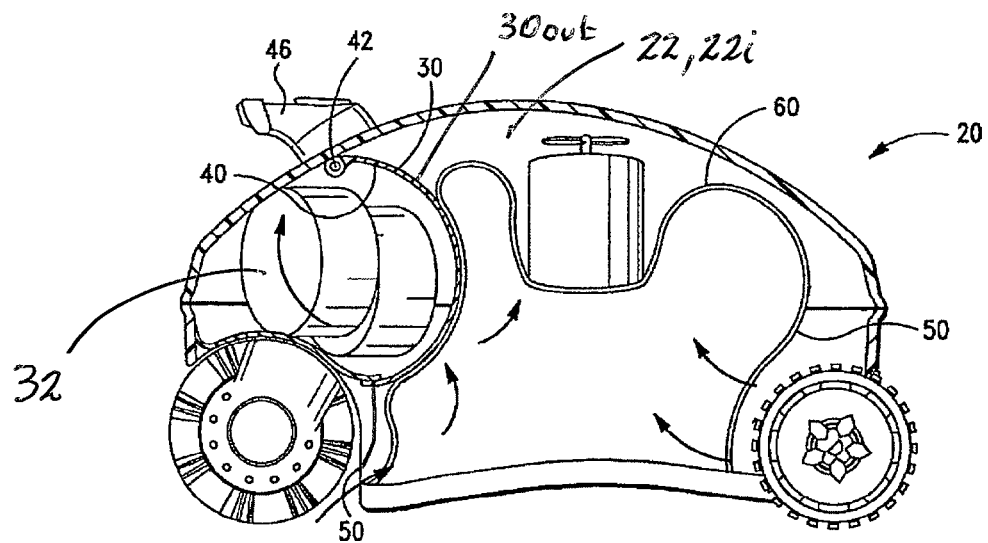
FIGS. 2-4 are side plan views of other exemplary embodiments of the pool cleaning vehicle in accordance with this invention illustrating a chemical dispenser member integrated within the interior of the vehicle housing.

The packet 32 containing chemicals is shown in close up view in FIG. 2. The packet 32 has an outer surface or skin 34. The outer surface is non-reactive and impenetrable by water. However, the packet 32 has a water soluble seal 36. The seal 36 is dissolvable upon continued contact with the pool water. Upon the seal 36 dissolving, chemicals within the packet 32 are released through the opening created by the dissolved seal 36.

As the vehicle 20 moves along the pool surface through the pool water, it releases it chemicals throughout its travels. The vehicle 20 operates at the floor of the pool. That means that mixing of the chemicals released by the chemical dispenser member 30 occurs at the bottom of the pool. By mixing the chemicals at the lower depths of the pool water, complete mixing is encouraged. Unlike releasing chemicals at the surface water level where the chemicals to be dissolved in the water are much more likely to evaporate or become ineffective before complete mixing.

FIG. 2 illustrates another exemplary embodiment of the vehicle 20 in accordance with the invention. In this embodiment, the chemical dispenser member 30 is integral with the vehicle. Here, the vehicle 20 includes a chemical dispenser member 30 having its own compartment 40.

Figure 3:
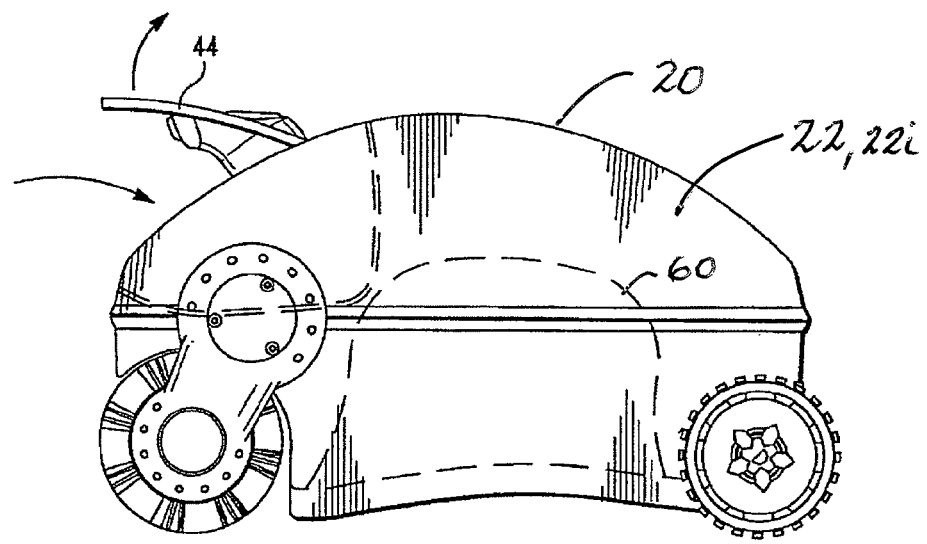
Figure 4:
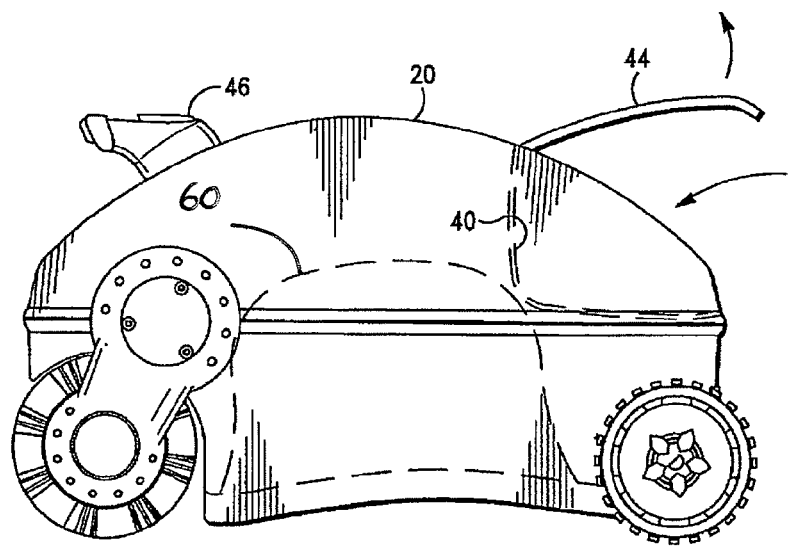

The compartment 40 includes a compartment door 44, which rotates on an axle 42 when the door 44 is lifted to the open position as shown in FIG. 3. FIG. 3 shows the compartment 40 on one end of the vehicle 20, while FIG. 4 shows the compartment 40 on the end of the vehicle 20 in another exemplary embodiment.

As is known, in order to remove the pool from the water, the vehicle 20 includes a handle 46. In the exemplary embodiment shown in FIGS. 2 & 3, the compartment 40 is proximate the handle 46. In this embodiment, the door 44 swings open and closed and must be place on the housing 22 of the vehicle 20 and sized and shaped so as not to be obstructed by the handle 46.

Figure 5:
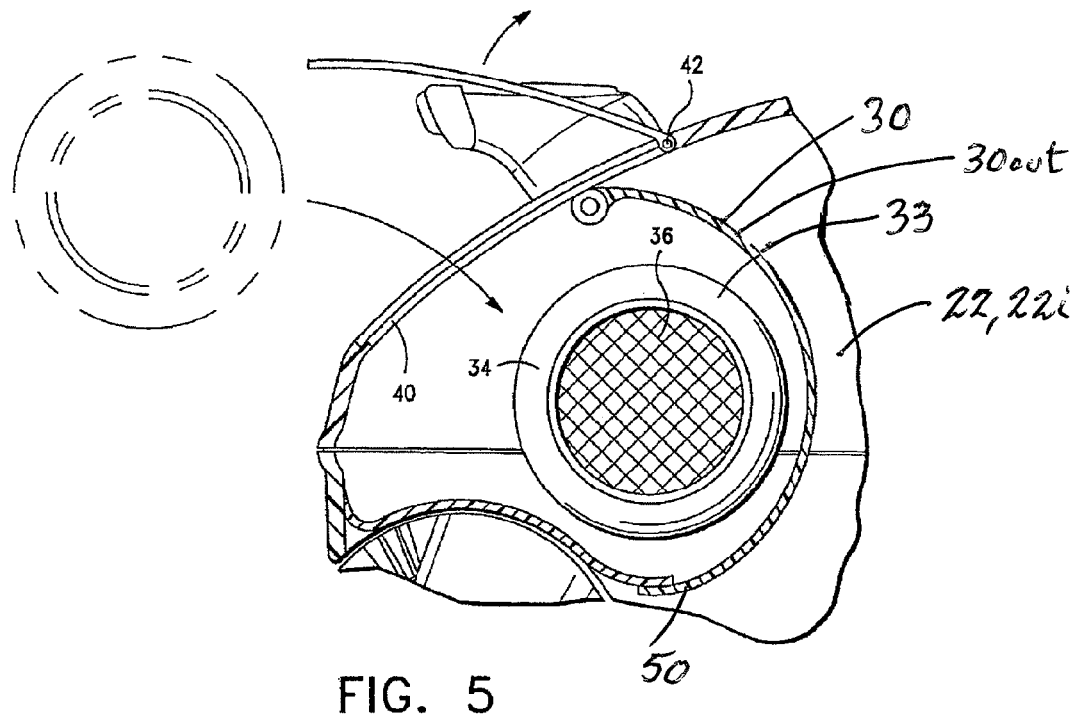
FIG. 5 is an enlarged plan view illustrating the insertion of the chemical for sanitizing pool water into the chemical dispenser member for an exemplary embodiment of the pool cleaning vehicle in any of FIGS. 2-4.

The door 44 opens to allow a chemical packet 32 to be placed in the compartment 40 as best shown in FIG. 2, or alternatively, to allow a chemical container 33 to be placed in the compartment 40 as best shown in FIG. 5. As noted above, the outside surface 34 of the chemical packet 32 is non-reactive. Similarly, the outside surface 34 of chemical container 33 is non-reactive. Thus, when the user places the sealed packet 32 or the chemical container 33, the act is done so without the user contacting the chemicals themselves.

As the vehicle 20 moves around the pool, water flows through the vehicle interior 22i generally in the direction indicated by the arrows of FIG. 2. As the vehicle 20 moves through the water, the pool water enters the vehicle 20 through the inlets 50. As shown, the pool water enters the filter bag 60 after entering the vehicle 20. As the vehicle 20 continues its movement through the pool water and also through the action of an internal pump, which creates a vacuum in the interior of the pool vehicle housing 22, the water proceeds from the filter bag 60 to the compartment 40 through the inlet 50 of the compartment.

As described above, upon sufficient contact with the water, the water soluble seal 36 of the chemical packet 32 (or chemical container 33) dissolves and releases chemical(s). The water mixes with the chemicals and upon continued pumping and movement of the vehicle 20, the water returns to the pool through the outlet 30out of the compartment 40. Whereby, upon return to the pool, the water has been filtered so it's free of dirt and debris and mixed with chemicals for sanitizing the water.

Figure 6:
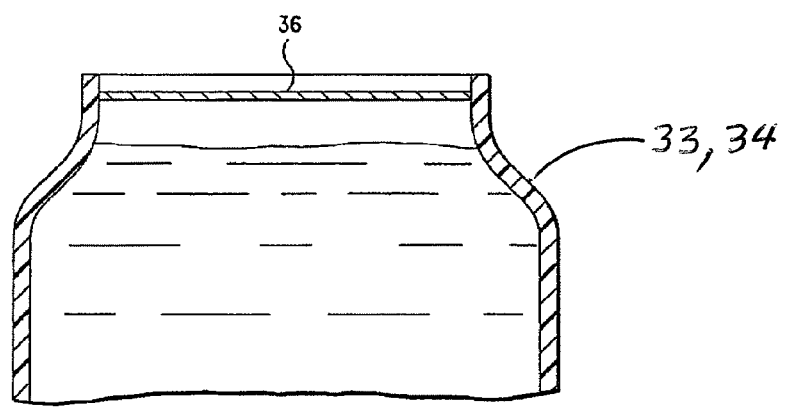
FIG. 6 is a side view of the container including liquid chemical for sanitizing pool water.

FIG. 6 illustrates, in cross section, the container 33 holding the chemical(s) for sanitizing the pool water. The outer surface 34 of the container 33 is non-reactive with water. Neither is the outer surface 34 reactive to a human touch. For example, in the exemplary embodiment shown the container 33 is made from glass.

The container 33 includes a water soluble seal 36. In the embodiment of FIG. 6, the chemical is a liquid chemical. In the earlier described embodiments, the chemical(s) is a solid.

Figure 7:
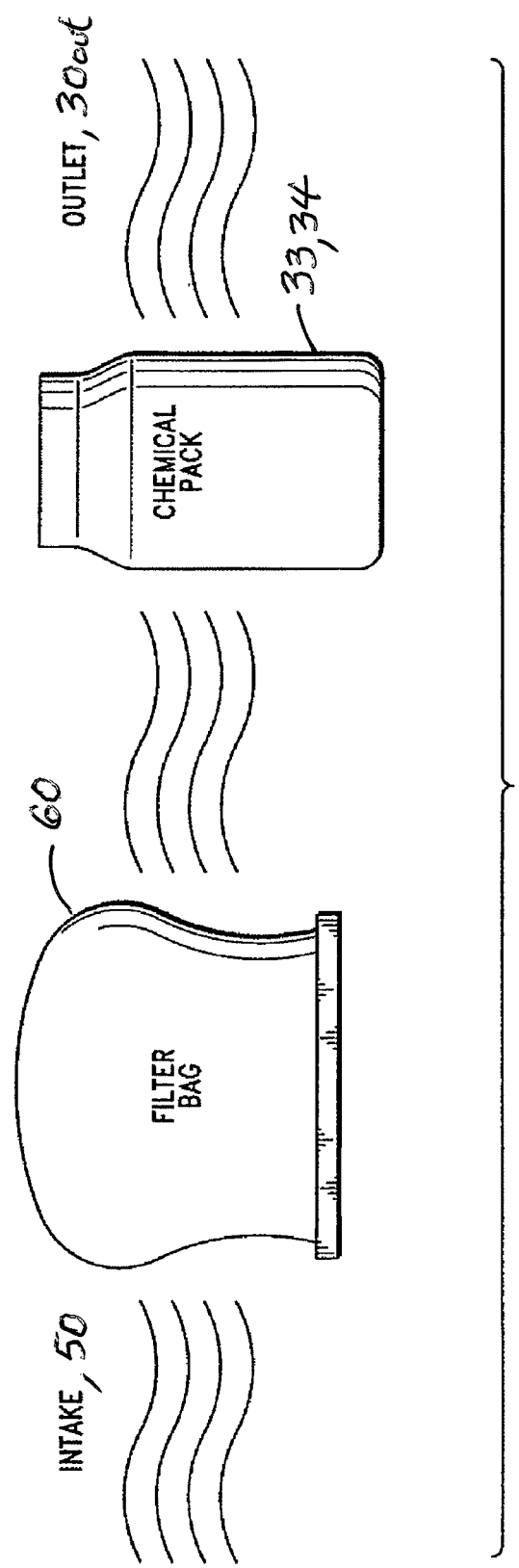
FIG. 7 is a schematic of the flow chart, illustrating the method of the invention for cleaning and sanitizing pool water in accordance with this invention.

With particular reference to the schematic of FIG. 7, there is shown a method of cleaning and sanitizing the pool water according to the invention set forth herein. As described above pool water enters the vehicle 20 through the intake of the housing 22. From there the water goes through the filter bag 60 where dirt and debris are trapped. The water continues its path through the filter bag 60 to the chemical packet 32.

The chemical packet 32 is held within the container 33. The compartment 40 of the chemical dispenser member 30 has an inlet 50 and water flows through the inlet 50 into the chemical dispenser member 30. While in the container 33, the water contacts the water soluble seal 36, eventually dissolving the seal 36 and allowing the chemical to escape from the packet 32 held in container 33 and mix with the pool water.

After mixing with the chemical, the water proceeds to the outlet 30out compartment 40 of the chemical dispenser member 30 and then returns to the pool water. The process continues and eventually the entire contents of the chemical(s) are mixed with the pool water. As noted above since the mixing occurs at the bottom levels of the pool, less of the chemical is exposed to sunlight and less will be likely to evaporate and become ineffective for sanitizing.

Figure 8:
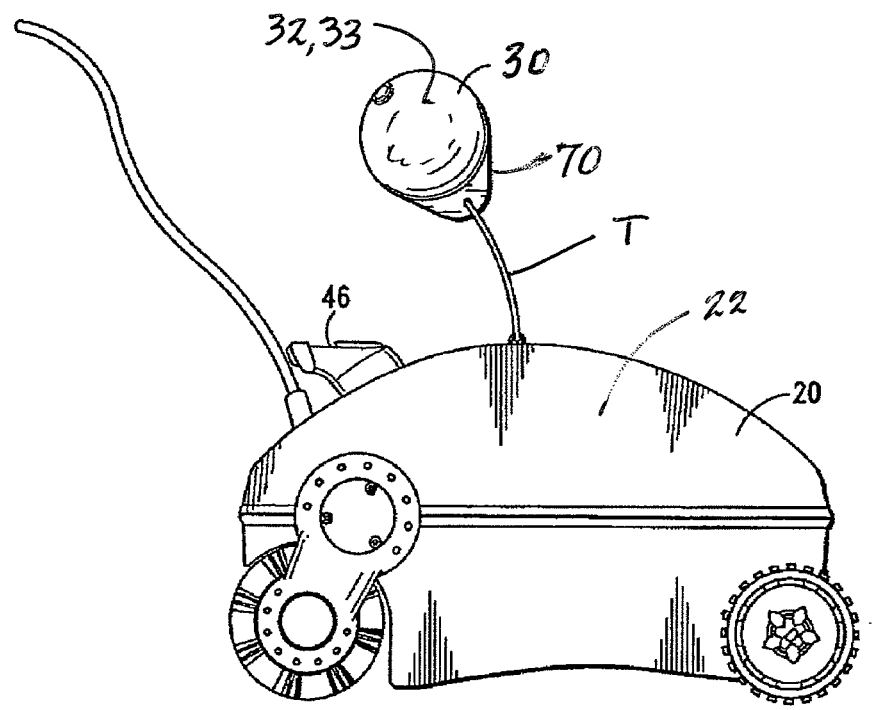
FIGS. 8 & 9 illustrate additional exemplary embodiments of the chemical dispenser member in accordance with this invention, wherein the chemical dispenser member is external to the vehicle.
Figure 9:
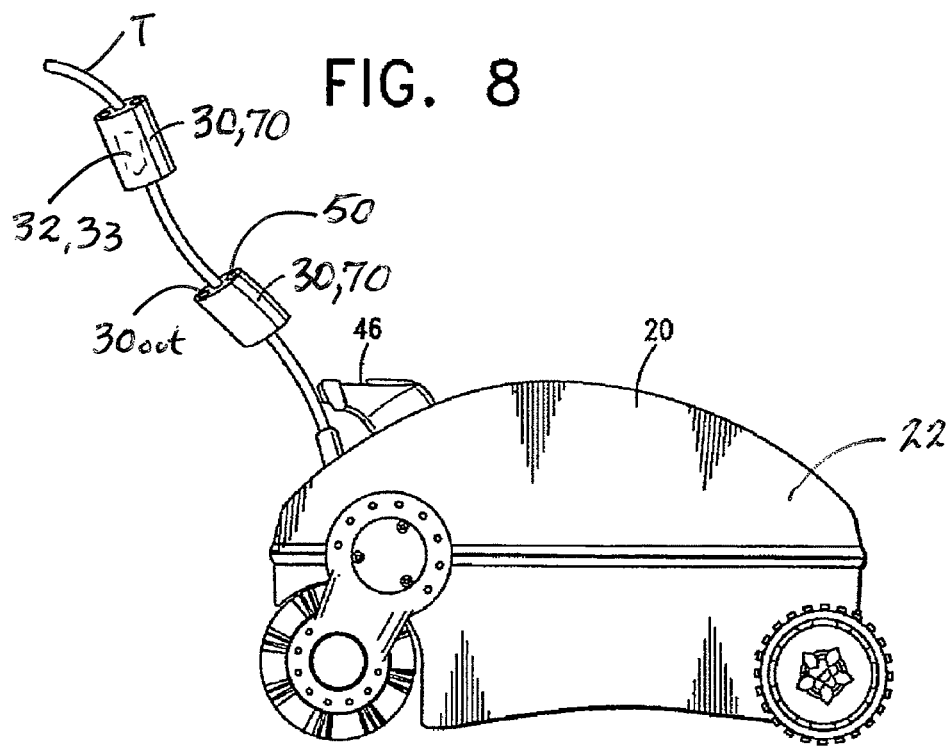

FIGS. 8 & 9 show an alternative embodiment of the vehicle in accordance with the invention having a chemical dispenser member 30 external to the housing 22. In these embodiments, the container 70 normally floats even with the chemical packet 32 inside the container 70.

The container(s) 70 is tethered to the housing 22 in a suitable manner by tether T. FIG. 8 represents an embodiment having a single chemical dispenser member 30 with one packet 32 or container 33, while FIG. 9 represents an embodiment having multiple chemical dispenser members 30 each having a packet 32 or a container 33. Each embodiment shares the fact that the chemical in the packets or the containers mixes directly with the pool water without use of the housing 22 or the filter bag 60.

While the foregoing detailed description has described several embodiments of the pool cleaning vehicle in accordance with this invention, it is to be understood that the above description is illustrative only and not limiting of the disclosed invention.

Particularly, there are variety of different kinds of chemical packets, chemical containers and different chemical that could be used in conjunction with the vehicle to clean and sanitize the pool water within the spirit and scope of the invention. It also will be appreciated that there are various modifications to the chemicals and the location of the chemical dispenser member are also within the spirit and scope of the invention herein and that of particular interest is the ability of the chemical dispenser member to work cooperatively with the pool cleaning vehicle to clean and sanitize pool water. Thus, the invention is to be limited only by the claims as set forth below.

What is claimed is:

1. A pool cleaning vehicle for sanitizing and cleaning pool water, the vehicle including a housing and the housing having an interior, the vehicle comprising:
   a chemical dispenser member connected to the housing, the chemical dispenser member having a hollow interior suitable for storing, in one or more packages, chemicals for sanitizing the pool water, the chemical dispenser member having an inlet for allowing the pool water to contact the one or more packages of the chemicals in the chemical dispenser member;
   each of the packages of the chemicals having a dissolvable seal, and upon continued contact with the water, the seal dissolving;
   the chemical dispenser member having an outlet facilitating communication between the chemical dispenser member and the pool water through the outlet of the chemical dispenser member;
   whereby upon the seal of each of the one or more packages being dissolved, and communication between the chemicals in an interior of each of the packages and the pool water is established.

2. A pool cleaning vehicle as set forth in claim 1, wherein the chemicals in the packages are solid.

3. A pool cleaning vehicle as set forth in claim 1, wherein the chemicals in the packages are liquid.

4. A pool cleaning vehicle as set forth in claim 1, wherein the pool cleaning vehicle includes a filter bag within the interior of the housing, and the pool water from the filter bag is in communication with the chemical dispenser member.

5. A pool cleaning vehicle as set forth in claim 4, wherein the pool water flows through the filter bag, and then into the chemical dispenser member, before the pool water passes out through the outlet of the chemical dispenser member.

6. A pool cleaning vehicle as set forth in claim 4, wherein the chemical dispenser member is within the interior of the housing.

7. A pool cleaning vehicle as set forth in claim 4, wherein the chemical dispenser member is disposed outside of the housing.

8. A method of cleaning and sanitizing pool water in a pool using a pool cleaning vehicle, the steps comprising:
   causing the pool water to enter the pool cleaning vehicle;
   filtering pool water through use of a filter bag;
   transferring the pool water through a chemical dispenser member, the chemical dispenser member containing one or more packages of chemicals each having a dissolvable seal, and upon continued contact with the pool water, the seal dissolving; and
   transferring the pool water from the chemical dispenser member after the pool water passes through the filter bag, and after coming in contact with the chemicals from the one or more packages in the chemical dispenser member.

9. The method of claim 8, wherein the pool water is filtered through the filter bag prior to being transferred to the chemical dispenser member.

10. A pool cleaning vehicle for sanitizing and cleaning pool water, the vehicle including a housing and the housing having an interior, the vehicle comprising:
   a chemical dispenser member connected to, but external to the housing, the chemical dispenser member having a hollow interior suitable for storing, in one or more packages, chemicals for sanitizing pool water, the chemical dispenser member having an inlet for allowing the pool water to contact with the one or more packages of the chemicals in the chemical dispenser member;
   each of the packages of the chemicals having a dissolvable seal, and upon continued contact with the water, the seal dissolving;
   the chemical dispenser member having an outlet facilitating communication between the chemical dispenser member and the pool water through the outlet of the chemical dispenser member;
   whereby upon the seal of each of the one or more packages of the chemicals being dissolved, communication between the chemicals in an interior of the packages and the pool water is established.

11. A pool cleaning vehicle as set forth in claim 10, wherein the chemical dispenser member connected to the housing by a tether.

12. A pool cleaning vehicle as set forth in claim 11, wherein the chemical dispenser member includes multiple chemical dispenser members.

13. A chemical dispenser member for use in connection with a pool cleaning vehicle, the pool cleaning vehicle having a housing, the chemical dispenser member comprising:
- a container member arranged inside the chemical dispenser member which is connectable to the housing of the pool cleaning vehicle,
- the container member having a hollow interior suitable for storing chemicals for sanitizing pool water, the chemical dispenser member having an inlet for allowing the pool water to enter an interior of the chemical dispenser member, and an outlet capable of communicating with the pool water;
- the container member having a dissolvable seal for sealing the container member, and;
- whereby, upon sufficient contact with the pool water, the seal dissolves and water enters the container member and mixes with the chemicals in the interior of the container member, and
- after mixing the water with the chemicals in the container member, the pool water flowing out of the container member and back to the pool water through the outlet of the chemical dispenser member.

* * * * *